US009219390B2

(12) United States Patent
Yoshizawa et al.

(10) Patent No.: US 9,219,390 B2
(45) Date of Patent: Dec. 22, 2015

(54) ROTATING ELECTRICAL MACHINE

(71) Applicant: KABUSHIKI KAISHA YASKAWA DENKI, Kitakyushu-shi (JP)

(72) Inventors: Naotake Yoshizawa, Kitakyushu (JP); Kiyomi Inoue, Kitakyushu (JP); Yoshiaki Kamei, Kitakyushu (JP); Takaaki Shibuya, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 385 days.

(21) Appl. No.: 13/802,802

(22) Filed: Mar. 14, 2013

(65) Prior Publication Data
US 2014/0111053 A1    Apr. 24, 2014

(30) Foreign Application Priority Data

Oct. 22, 2012    (JP) .................................. 2012-232599

(51) Int. Cl.
*H02K 1/27*    (2006.01)
(52) U.S. Cl.
CPC ................... *H02K 1/2773* (2013.01)
(58) Field of Classification Search
None
See application file for complete search history.

(56) References Cited

U.S. PATENT DOCUMENTS

| 6,025,667 | A | * | 2/2000 | Narita et al. ............. 310/156.53 |
| 2011/0121668 | A1 | | 5/2011 | Condamin et al. |
| 2012/0038237 | A1 | | 2/2012 | Li et al. |
| 2012/0326548 | A1 | | 12/2012 | Nonaka |

FOREIGN PATENT DOCUMENTS

| JP | 2001-359249 | 12/2001 |
| WO | WO 2008/078584 | 7/2008 |
| WO | WO 2009/153511 | 12/2009 |
| WO | WO 2011/114594 | 9/2011 |

OTHER PUBLICATIONS

Korean Office Action for corresponding KR Application No. 10-2013-0055901, Aug. 26, 2014.
Japanese Office Action for corresponding JP Application No. 2012-232599, Mar. 6, 2014.
Extended European Search Report for corresponding EP Application No. 13164620.0-1809, Jan. 8, 2014.
Chinese Office Action for corresponding CN Application No. 201310184423.9, Sep. 11, 2015.

\* cited by examiner

*Primary Examiner* — Tran Nguyen
(74) *Attorney, Agent, or Firm* — Mori & Ward, LLP

(57) ABSTRACT

The disclosure discloses a rotating electrical machine including a stator and a rotor. The rotor includes a cylindrical iron core that is fixed to a shaft and comprises a radial direction and an axial direction, a plurality of permanent magnets that is embedded in the iron core, a plurality of air gaps that are respectively provided in a portion on an inner side of the iron core in the radial direction, a wedge portion that is provided along the axial direction so as to protrude within the air gap, and a non-magnetic reinforcing member that is filled in the air gap.

4 Claims, 6 Drawing Sheets

FIG. 3A
FIG. 3B
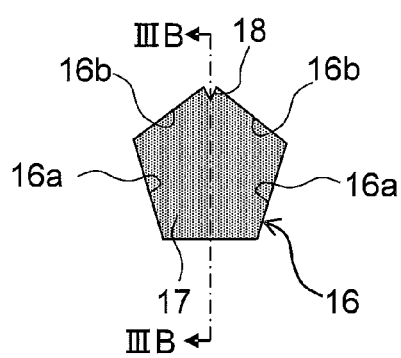
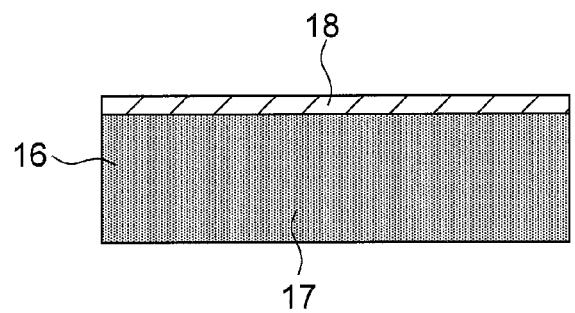
FIG. 4A
FIG. 4B
FIG. 4C
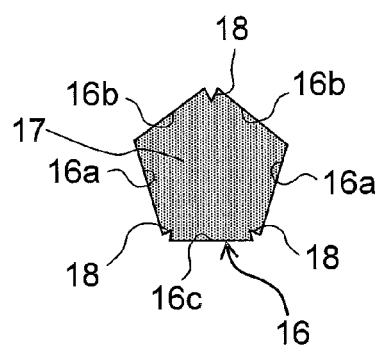
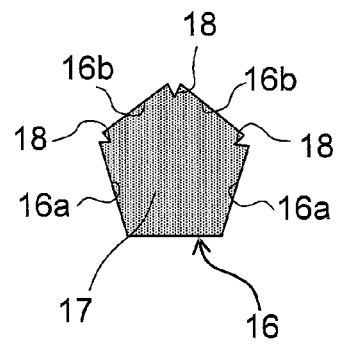
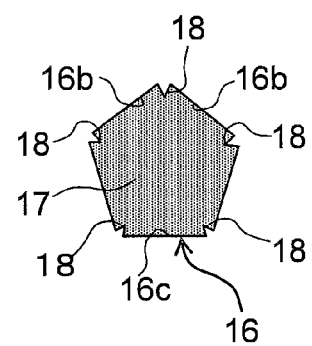

ROTATING ELECTRICAL MACHINE

CROSS-REFERENCE TO RELATED APPLICATION

The present application claims priority from Japanese Patent Application No. 2012-232599, which was filed on Oct. 22, 2012, the disclosure of which is incorporated herein by reference in its entirety.

BACKGROUND OF THE INVENTION

1. Field of the Invention

An embodiment disclosed relates to rotating electrical machines.

2. Description of the Related Art

The embedded-magnet type motor that includes a stator and a rotor which faces the stator through a gap in a radial direction is known.

SUMMARY OF THE INVENTION

According to one aspect of the disclosure, there is provided a rotating electrical machine including a stator and a rotor. The rotor includes a cylindrical iron core that is fixed to a shaft and comprises a radial direction and an axial direction, a plurality of permanent magnets that is embedded in the iron core, a plurality of air gaps that are respectively provided in a portion on an inner side of the iron core in the radial direction, a wedge portion that is provided along the axial direction so as to protrude within the air gap, and a non-magnetic reinforcing member that is filled in the air gap.

BRIEF DESCRIPTION OF THE DRAWING

FIG. 3A is a horizontal cross-sectional view showing the shape of an air gap having a wedge portion formed on an inner side of an iron core of the rotor in the radial direction;

FIG. 3B is a cross-sectional view taken along IIIB-IIIB cross section of FIG. 3A;

FIG. 4A is a horizontal cross-sectional view showing the shape of the air gap in a variation in which a plurality of wedge portions is provided;

FIG. 4B is a horizontal cross-sectional view showing the shape of the air gap in a variation in which a plurality of wedge portions is provided;

FIG. 4C is a horizontal cross-sectional view showing the shape of the air gap in a variation in which a plurality of wedge portions is provided;

DESCRIPTION OF THE EMBODIMENTS

An embodiment will be described below with reference to accompanying drawings.

<Configuration of a Rotating Electrical Machine>

Figure 1:
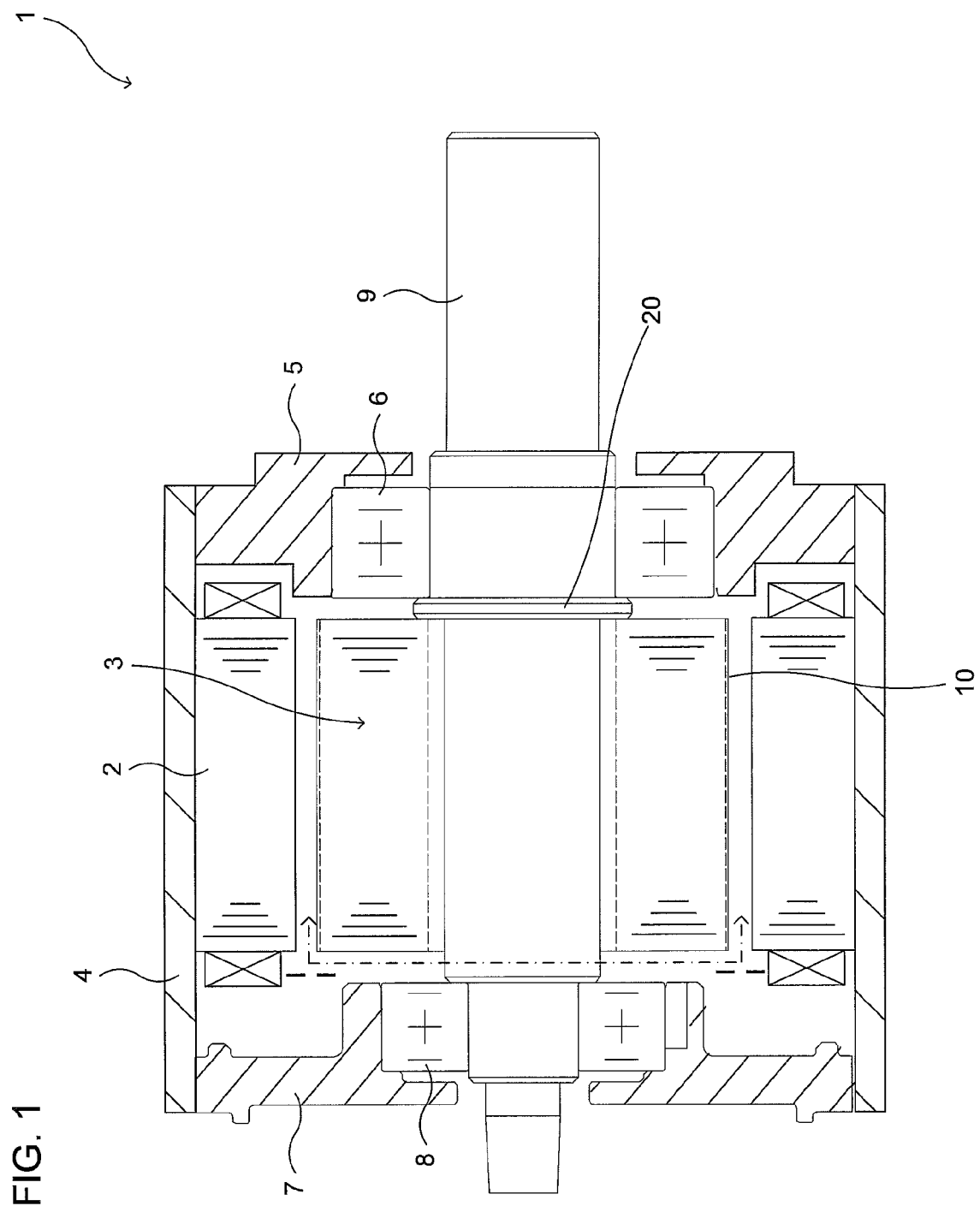
FIG. 1 is a vertical cross-sectional view showing the overall configuration of a rotating electrical machine of an embodiment.

An overall configuration of a rotating electrical machine 1 according to the present embodiment will first be described with reference to FIG. 1. As shown in FIG. 1, the rotating electrical machine 1 is an inner rotor type motor in which a rotor 3 is provided inside a stator 2. The stator 2 and the rotor 3 are arranged facing each other in a radial direction of the rotor 3 (in other words, a radial direction of an iron core 10 described later; hereinafter referred simply to as a "radial direction" as necessary) through a magnetic air gap. Specifically, the rotating electrical machine 1 is an IPM (Interior Permanent Magnet) motor in which a permanent magnet is provided within the rotor 3.

The rotating electrical machine 1 includes: the stator 2; the rotor 3; a frame 4; a load-side bracket 5; a load-side bearing 6; an opposite load-side bracket 7; an opposite load-side bearing 8; a shaft 9; and holding plates 20. The frame 4 is provided on the above-described outer side of the stator 2 in the radial direction. The load-side bracket 5 is provided on a load side (on the right side in FIG. 1) end portion of the frame 4. An outer ring of the load-side bearing 6 is fitted to the load-side bracket 5. The opposite load-side bracket 7 is provided on the side opposite to the load side (on the left side in FIG. 1) end portion of the frame 4. An outer ring of the opposite load-side bearing 8 is fitted to the opposite load-side bracket 7. Both sides of the shaft 9 in an axial direction (in other words, an axial direction of the iron core 10 described later; hereinafter referred simply to as an "axial direction" as necessary) are rotatably supported by the load-side bearing 6 and the opposite load-side bearing 8, respectively. The holding plate 20 is fixed to the shaft 9 and is butted against one end side (in this example, the load side) of the iron core 10 in the above-described axial direction.

Although one holding plate 20 is used in this example, two holding plates 20 may be used at the shaft 9 so as to be butted against one end side and the other end side of the iron core 10 in the above-described axial direction. The holding plate 20 is butted against one or both of the one end side and the other end side of the iron core 10 in the above-described axial direction, and thereby the iron core 10 is positioned.

<Configuration of the Rotor>

Figure 2:
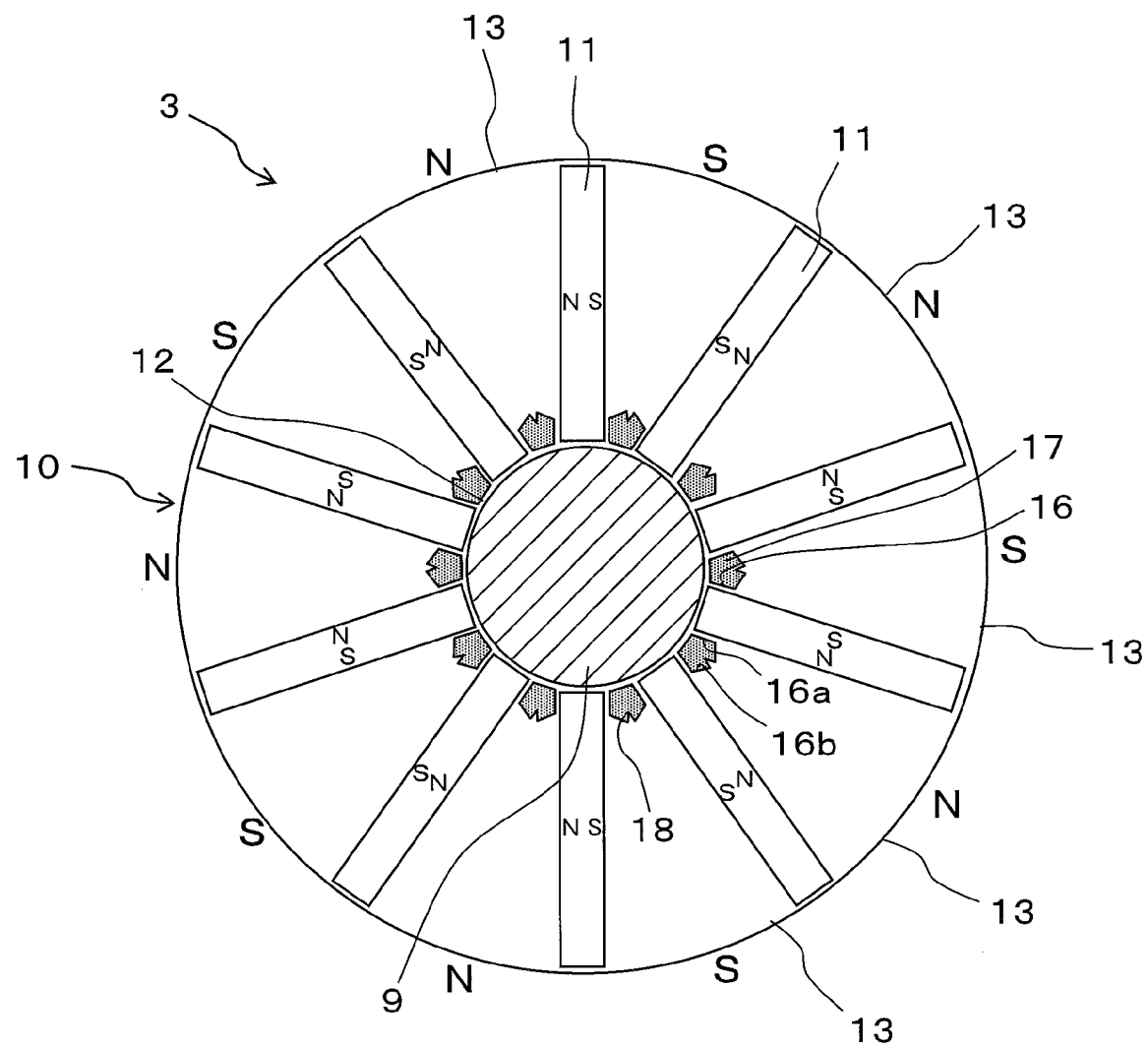
FIG. 2 is a cross-sectional view taken along II-II cross section of FIG. 1.

The configuration of the rotor 3 will now be described with reference to FIGS. 2 and 3. As shown in FIG. 2, the rotor 3 is fixed to the outer circumferential surface of the shaft 9. The rotor 3 includes the cylindrical iron core 10 and a plurality of (in this example, ten) permanent magnets 11 embedded in the iron core 10.

The iron core 10 integrally includes a cylindrical portion 12 and magnetic pole portions 13. The cylindrical portion 12 is fixed to the shaft 9. A plurality of (in this example, ten) magnetic pole portions 13 is radially provided on the outer side of the cylindrical portion 12 in the above-described radial direction, according to the number of poles. The iron core 10 is formed in a laminated body structure in which circular magnetic steel sheets are laminated in the above-described axial direction of the shaft 9. Between the laminated magnetic steel sheets, an insulating layer is inserted. The permanent magnet 11 is formed in the shape of a rectangular parallelepiped long in the above-described axial direction of the iron core 10. In the permanent magnet 11, a cross section perpendicular to the above-described axial direction has a rectangular shape long in the above-described radial direction. The permanent magnet 11 is radially arranged within the iron core 10. The permanent magnet 11 is fitted into a through hole provided in the iron core 10 in the above-described axial direction and is provided to penetrate the iron core 10. In the outer-side end and the inner-side end of the permanent magnet 11 in the above-described radial direction, and between the outer circumferential surface and the inner circumferential surface of the iron core 10, narrow gaps are formed.

Each of the permanent magnets 11 is magnetized in a direction (substantially circumferential direction) perpendicular to the above-described radial direction and the above-described axial direction of the iron core 10. A plurality of permanent magnets 11 are arranged such that, in a certain magnetic pole portion 13, N poles face each other, and that in the next magnetic pole portion 13, S poles face each other. The magnetic pole portion 13 is formed on the outer-side of the cylindrical portion 12 in the above-described radial direction and between the adjacent permanent magnets 11. The magnetic pole portion 13 in the location where the N poles of the two adjacent permanent magnets 11 face each other becomes an N pole; the magnetic pole portion 13 in the location where the S poles of the two adjacent permanent magnets 11 face each other becomes an S pole. A magnetic flux travels from the magnetic pole portion 13 of the N pole to the magnetic pole portion 13 of the S pole is interlinked with the windings of the stator 2 to generate a rotary torque of the rotor 3.

In a portion on the inner side of the iron core 10 in the above-described radial direction, positioned between the adjacent permanent magnets 11, an air gap 16 penetrating the iron core 10 in the above-described axial direction is provided. In this example, the horizontal section of the air gap 16 perpendicular to the above-described axial direction is substantially pentagonal. As shown in FIGS. 2 and 3A, the air gap 16 has magnet facing surfaces 16a that face the side surfaces of the permanent magnets 11, which are magnetic flux generating surfaces and that are in the above-described radial direction, and magnetic flux guide surfaces 16b that are connected to the magnet facing surfaces 16a and that are on the outer side in the above-described radial direction. The magnet facing surface 16a of the air gap 16 forms a narrow gap between the magnet facing surface 16a and the magnetic flux generating surface of the permanent magnet 11, and is substantially parallel to the magnetic flux generating surface. The air gap 16 guides, with the magnetic flux guide surface 16b, the magnetic flux of the permanent magnet 11 in the magnetic pole portion 13 of the N pole to the outer side of the rotor 3 in the above-described radial direction. Furthermore, the air gap 16 can reduce, with the magnet facing surface 16a, a leakage magnetic flux to the inner side of the rotor 3 in the above-described radial direction between the two adjacent permanent magnets 11.

As shown in FIG. 3A, in order for the rigidity of the iron core 10 to be enhanced, the air gap 16 is filled with a resin 17 (an adhesive may be used) as a reinforcing member of a non-magnetic material. Further, in the air gap 16, a wedge portion 18 that protrudes to the inner side of the air gap 16 in the above-described radial direction is provided in a corner portion that is the above-described radial direction outer side of the above-described pentagon (that is, a corner portion on the outer side of the air gap 16 in the above-described radial direction, located between the magnetic flux guide surfaces 16b of the air gap 16). The cross section of the wedge portion 18 perpendicular to the above-described axial direction is substantially V-shaped. As shown in FIG. 3B, the wedge portion 18 is provided to extend along the above-described axial direction so as to have the same height, and the entire wedge portion 18 in the above-described axial direction is driven into the resin 17 filled in the air gap 16. The wedge portion 18 is obtained by individually forming a plurality of magnetic steel sheets so as to have wedge portions and laminating a plurality of magnetic steel sheets in the above-described axial direction. The wedge portion 18 functions as means for enhancing the rigidity of the iron core 10. The resin 17 also functions as means for blocking the magnetic flux of the permanent magnets 11.

<Effects of the Embodiment>

As described above, in the rotating electrical machine 1 of the present embodiment, a plurality of air gaps 16 is formed in the portion on the inner side of the iron core 10 of the rotor 3 above-described in the above-described radial direction, and the air gap 16 is filled with the resin 17. Since the resin 17 is non-magnetic, the air gap 16 filled with the resin 17 can be regarded as an air gap itself magnetically. Hence, the leakage magnetic flux to the inner side of the rotor 3 in the above-described radial direction is blocked by the air gap 16, and thus it is possible to reduce the leakage magnetic flux. Then, with the resin 17 filled in the air gap 16, it is possible to prevent the decrease in the rigidity of the iron core 10 caused by provision of the air gap 16.

Furthermore, in the inside of the air gap 16, the wedge portion 18 whose cross section perpendicular to the above-described axial direction is substantially V-shaped is provided to protrude along the above-described axial direction. In the iron core 10, the wedge portion 18 is provided in the air gap 16, and thus its mechanical strength in the air gap 16 is enhanced. Moreover, the joint between the iron core 10 and the resin 17 is strengthened by the wedge action resulting from the wedge portion 18 being driven into the resin 17 filled in the air gap 16 (that is, the effect that the resin 17 sandwiches and holds the wedge portion 18 from both sides thereof and the effect of increasing the contact area between the inner surface of the air gap 16 and the resin 17). Consequently, it is possible to enhance the rigidity of the iron core 10.

In the present embodiment, in particular, the wedge portion 18 is provided in the position on the outer side of the air gap 16 in the above-described radial direction within the air gap 16. With the arrangement, the following effects are obtained. Specifically, a centrifugal force resulting from the rotation acts on the iron core 10 of the rotor 3. Hence, in each of the air gaps 16, a separation force acting between the filled resin 17 and the inner surface of the air gap 16 is increased in a position in the above-described radial direction outer side of the air gap 16. In the present embodiment, since the wedge portion 18 is provided in the position on the outer side of the air gap 16 in the above-described radial direction, it is possible to obtain a high joint force between the iron core 10 and the resin 17 in the direction of the centrifugal force as a result of the wedge action. As a result, it is possible to prevent the resin 17 from being separated from the inner surface of the air gap 16, and thus it is possible to further increase the effect of enhancing the rigidity of the iron core 10.

Moreover, in the present embodiment, in particular, the cross section of the air gap 16 perpendicular to the above-described axial direction is pentagonal, and the wedge portion 18 is provided in the above-described pentagonal corner portion of the air gap 16. With the arrangement, the following effects are obtained. Specifically, when the cross section of the air gap 16 is polygonal, stress concentration is more likely to occur in the corner portion where the shape of the air gap 16 is uncontinous, and this may cause a crack or the like. In the present embodiment, since the wedge portion 18 is provided in the corner portion of the air gap 16, it is possible to disperse the stress in the corner portion and alleviate the stress concentration. Hence, it is possible to further increase the effect of enhancing the rigidity of the iron core 10.

Moreover, in the present embodiment, in particular, the air gap 16 has the magnet facing surfaces 16a and the magnetic flux guide surfaces 16b. With the arrangement, it is possible to efficiently guide the magnetic flux of the permanent magnets 11 to the outer side of the rotor 3 in the above-described radial direction while effectively reducing the leakage magnetic flux to the inner side of the rotor 3 in the above-described radial direction. Hence, it is possible to obtain a torque corresponding to the amount of usage of the permanent magnets 11, and thus it is possible to enhance the motor characteristic of the rotating electrical machine 1.

Moreover, the wedge portion 18 is provided in the above-described corner portion located between the magnetic flux guide surfaces 16b of the air gap 16, and thus the following effects are obtained. Specifically, since the magnet facing surfaces 16a face the side surfaces of the permanent magnets 11, which are the magnetic flux generating surfaces, the direction of the magnetic flux is substantially perpendicular to the direction of the magnet facing surfaces 16a. Hence, when the wedge portion 18 is provided in the vicinity of the magnet facing surface 16a, there is a possibility that the magnetic flux passes through the interior of the air gap 16 through the wedge portion 18 and that this causes the leakage magnetic flux to be increased. On the other hand, since the magnetic flux guide surface 16b is a surface that guides the magnetic flux of the permanent magnets 11, the direction of the magnetic flux is substantially parallel to the direction of the magnetic flux guide surface 16b. Hence, even when the wedge portion 18 is provided in the vicinity of the magnetic flux guide surface 16b, there is little possibility that the magnetic flux passes through the interior of the air gap 16 through the wedge portion 18 and that this does not causes the leakage magnetic flux to be increased. Therefore, the wedge portion 18 is provided in the corner portion located between the magnetic flux guide surfaces 16b, and thus it is possible to enhance the rigidity of the iron core 10 without increasing the leakage magnetic flux.

<Variations>

The embodiment disclosed is not limited to what has been described above; many variations are possible without departing from the spirit and technical ideas thereof. Such variations will be described below.

(1) A case where a plurality of wedge portions is provided in the air gap

In the above-described embodiment, the wedge portion 18 is provided in only one corner portion of the air gap 16. The present disclosure is not limited to this configuration; the wedge portion 18 can be provided in the other corners of the air gap 16. Examples of such a variation are shown in FIGS. 4A to 4C.

In the example shown in FIG. 4A, the wedge portion 18 is provided not only in the corner portion in the position on the outer side of the air gap 16 having the above-described pentagonal cross section in the above-described radial direction but also in corner portions in positions on the inner side of the pentagon in the above-described radial direction (that is, in the two corner portions located between a shaft facing surface 16c of the air gap 16 that faces the shaft 9 and that is in the above-described radial direction and each of the magnet facing surfaces 16a). As in the above-described embodiment, the cross section of each of the wedge portions 18 perpendicular to the above-described axial direction is substantially V-shaped. Each of the wedge portions 18 is provided to extend along the above-described axial direction. The air gap 16 is filled with the resin 17.

In the example shown in FIG. 4B, the wedge portion 18 is provided not only in the corner portion in the position on the outer side of the above-described pentagonal cross section of the air gap 16 in the above-described radial direction but also in corner portions in positions on the side of the side surface of the pentagon (that is, in each of the corner portions located between the magnet facing surfaces 16a of the air gap 16 and the magnetic flux guide surfaces 16b of the air gap 16).

In the example shown in FIG. 4C, the wedge portions 18 are provided in all the corner portions of the air gap 16 of the above-described pentagonal cross section.

In each of the variations of FIGS. 4A to 4C, a plurality of wedge portions 18 is provided in the air gap 16, and thus it is possible to further enhance the mechanical strength of the iron core 10 in the air gap 16; moreover, the joint between the iron core 10 and the resin 17 is further strengthened by the wedge action resulting from a plurality of wedge portions 18 being driven into the resin 17 filled in the air gap 16. Consequently, it is possible to further enhance the rigidity of the iron core 10.

Figure 5A:
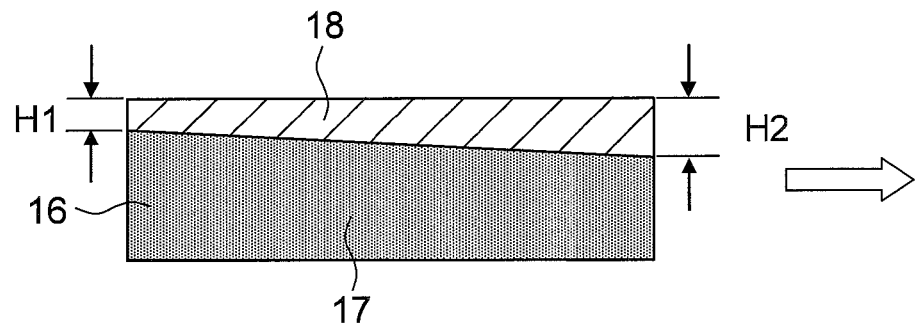
FIG. 5A is a horizontal cross-sectional view showing the shape of the air gap in a variation in which the length of the wedge portion in a direction of protrusion is changed in an axial direction.
Figure 5B:
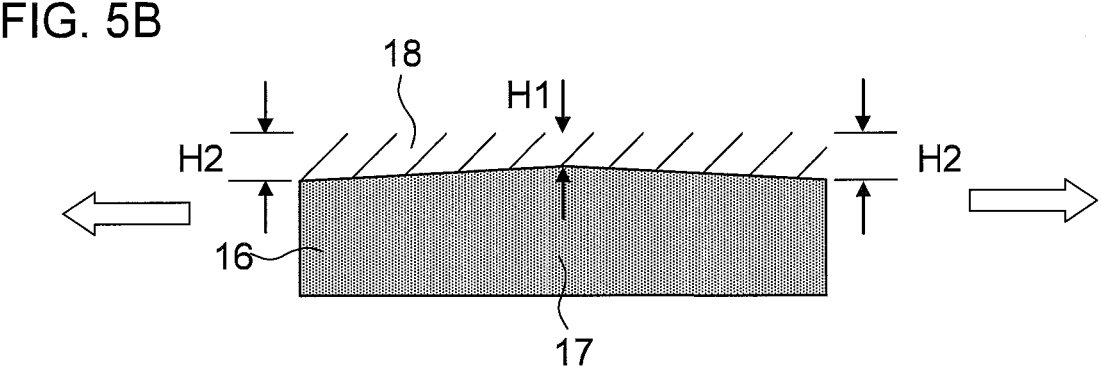
FIG. 5B is a horizontal cross-sectional view showing the shape of the air gap in a variation in which the length of the wedge portion in a direction of protrusion is changed in an axial direction.
Figure 5C:
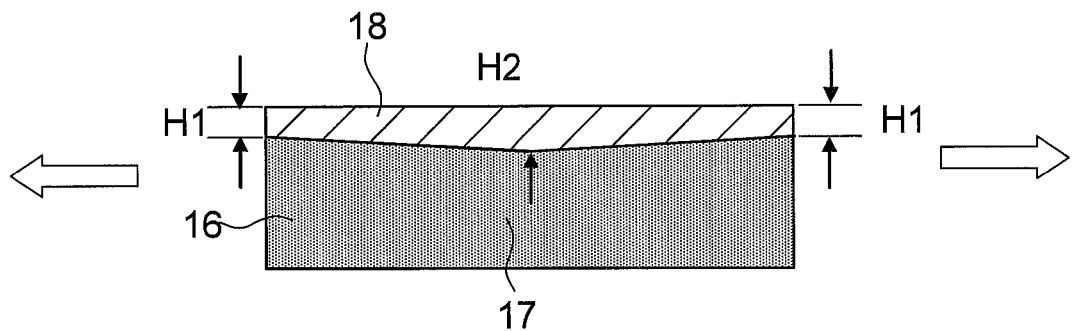
FIG. 5C is a horizontal cross-sectional view showing the shape of the air gap in a variation in which the length of the wedge portion in a direction of protrusion is changed in an axial direction.

(2) A case where the length of the wedge portion in the direction of protrusion is changed in the axial direction In the above-described embodiment, the length (height) of the wedge portion 18 in the direction of protrusion is uniform along the above-described axial direction of the air gap 16. The present disclosure is not limited to this configuration; the length of the wedge portion 18 in the direction of protrusion may be changed in the above-described axial direction of the air gap 16. Examples of such a variation are shown in FIGS. 5A to 5C. For ease of understanding, in FIGS. 5A to 5C, the length (the dimension in an up/down direction of each of the figures) of the wedge portion 18 in the direction of protrusion is exaggerated and shown.

In the example shown in FIG. 5A, the length of the wedge portion 18 in the direction of protrusion is H1 at one end of the air gap 16 in the above-described axial direction (on the left side in FIG. 5A), and is H2 at the other end of the air gap 16 in the above-described axial direction (on the right side in FIG. 5A) that is longer than H1. In other words, the length of the wedge portion 18 in the direction of protrusion is continuously increased from H1 at one end of the air gap 16 in the above-described axial direction to H2 at the other end in the axial direction.

In the example shown in FIG. 5B, the length of the wedge portion 18 in the direction of protrusion is H1 at the center portion of the air gap 16 in the above-described axial direction, and is H2 at one end and the other end in the above-described axial direction. In other words, the length of the wedge portion 18 in the direction of protrusion is continuously decreased from H2 at one end of the air gap 16 in the above-described axial direction to H1 at the center portion, and is then continuously increased from H1 at the center portion of the air gap 16 in the above-described axial direction to H2 at the other end in the above-described axial direction.

In the example shown in FIG. 5C, the length of the wedge portion 18 in the direction of protrusion is H2 at the center portion of the air gap 16 in the above-described axial direction, and is H1 at one end and the other end in the above-described axial direction. In other words, the length of the wedge portion 18 in the direction of protrusion is continuously increased from H1 at one end of the air gap 16 in the above-described axial direction to H2 at the center portion, and is then continuously decreased from H2 at the center portion of the air gap 16 in the above-described axial direction to H1 at the other end in the above-described axial direction.

In each of the variations of FIGS. 5A to 5C, the protrusion length of the wedge portion 18 of the air gap 16 is changed in the above-described axial direction. As a result, the movement of the resin 17 filled in the air gap 16 in the direction in which the protrusion length (height) of the wedge portion 18 is increased is limited. With the arrangement, for example, in the configuration shown in FIG. 5A, the resin 17 within the air gap 16 is prevented from moving out to the other side (the right side in FIG. 5A) in the above-described axial direction indicated by a white arrow. In the configuration shown in FIGS. 5B and 5C, the resin 17 within the air gap 16 is prevented from moving out to both of one side and the other side (both of the left and right sides in FIGS. 5B and 5C) in the above-described axial direction indicated by white arrows. Consequently, it is possible to stably obtain the effect of enhancing the rigidity of the iron core 10.

Figure 6A:
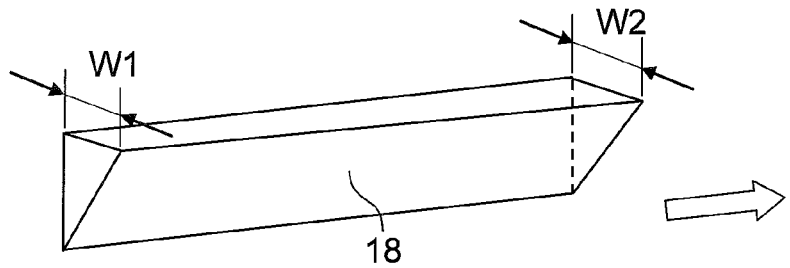
FIG. 6A is a perspective view obtained by extracting the shape of a wedge in a variation in which the width of the wedge portion is changed in the axial direction.
Figure 6B:
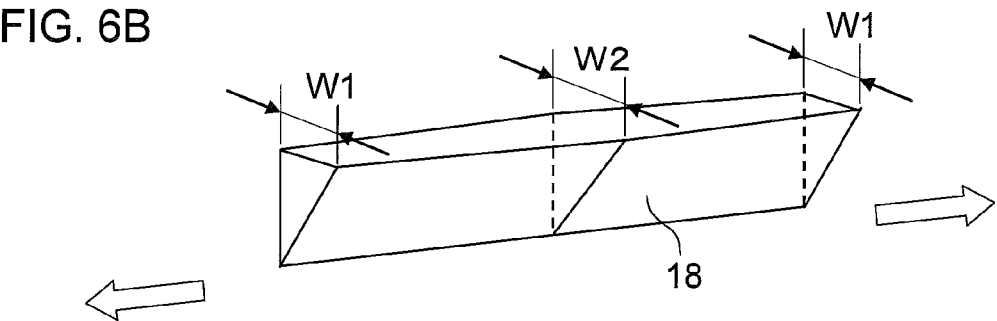
FIG. 6B is a perspective view obtained by extracting the shape of the wedge in a variation in which the width of the wedge portion is changed in the axial direction.
Figure 6C:
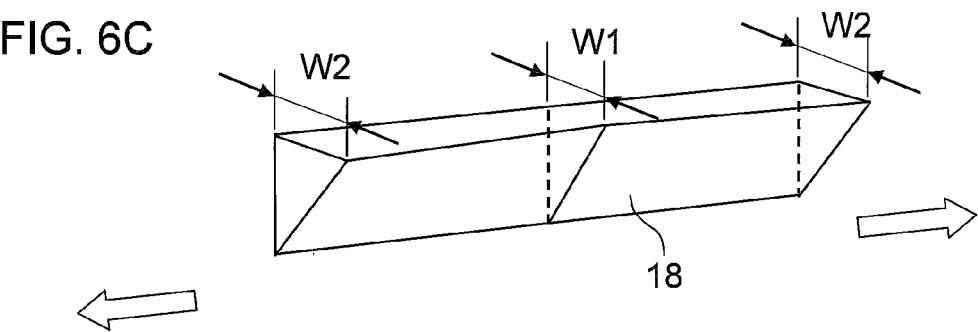
FIG. 6C is a perspective view obtained by extracting the shape of the wedge in a variation in which the width of the wedge portion is changed in the axial direction.

(3) A case where the width of the wedge portion is changed in the axial direction In the above-described embodiment, the width of the wedge portion 18 (that is, the width of a base end of the V-shaped cross section of the wedge portion 18) is uniform along the above-described axial direction. The present disclosure is not limited to this configuration; the width of the wedge portion 18 may be changed in the above-described axial direction of the air gap 16. Examples of such a variation are shown in FIGS. 6A to 6C. For ease of understanding, in FIGS. 6A to 6C, only the wedge portion 18 is extracted and shown.

In the example shown in FIG. 6A, the width of the wedge portion 18 is W1 at one end of the air gap 16 in the above-described axial direction (on the left side in FIG. 6A), and is W2 at the other end of the air gap 16 in the above-described axial direction (on the right side in FIG. 6A) that is longer than the W1. In other words, the width of the wedge portion 18 is continuously increased in the above-described axial direction from W1 at one end of the air gap 16 in the above-described axial direction to W2 at the other end.

In the example shown in FIG. 6B, the width of the wedge portion 18 is W2 at the center portion of the air gap 16 in the above-described axial direction, and is W1 at one end and the other end in the above-described axial direction. In other words, the width of the wedge portion 18 is continuously increased from W1 at one end of the air gap 16 in the above-described axial direction to W2 at the center portion, and is then continuously decreased from W2 at the center portion of the air gap 16 in the above-described axial direction to W1 at the other end in the above-described axial direction.

In the example shown in FIG. 6C, the width of the wedge portion 18 is W1 at the center portion of the air gap 16 in the above-described axial direction, and is W2 at one end and the other end in the above-described axial direction. In other words, the width of the wedge portion 18 is continuously decreased from W2 at one end of the air gap 16 in the above-described axial direction to W1 at the center portion, and is then continuously increased from W1 at the center portion of the air gap 16 in the above-described axial direction to W2 at the other end in the above-described axial direction.

In each of the variations of FIGS. 6A to 6C, the width of the wedge portion 18 of the air gap 16 is changed in the above-described axial direction. As a result, the movement of the resin 17 filled in the air gap 16 in the direction in which the width of the wedge portion 18 is increased is limited. With the arrangement, in the configuration shown in FIG. 6A, the resin 17 within the air gap 16 is prevented from moving out to one side (the right side in FIG. 6A) in the above-described axial direction indicated by a white arrow whereas, in the configuration shown in FIGS. 6B and 6C, the resin 17 within the air gap 16 is prevented from moving out to both of one side and the other side (both of the left and right sides in FIGS. 6B and 6C) in the above-described axial direction indicated by white arrows. Consequently, it is possible to stably obtain the effect of enhancing the rigidity of the iron core 10.

(4) A case where the cross section of the air gap is formed in the shape of a polygon other than a pentagon In the above-described embodiment, the cross section of the air gap 16 perpendicular to the above-described axial direction is pentagonal. The present disclosure is not limited to this configuration; the cross section of the air gap 16 may be formed in the shape of a polygon other than a pentagon. Examples of such a variation are shown in FIGS. 7A to 7C.

Figure 7A:
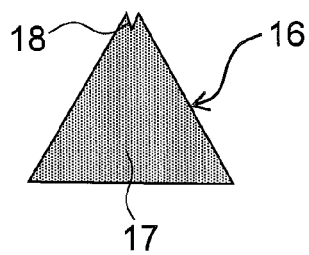
FIG. 7A is a perspective view showing the shape of the air gap in a variation in which the air gap is formed in the shape of a polygon other than a pentagon.

In the example shown in FIG. 7A, the cross section of the air gap 16 perpendicular to the above-described axial direction is formed in the shape of a triangle. In the air gap 16, the wedge portion 18 protruding inwardly is provided in the corner portion on the outer side of the triangle in the above-described radial direction, and the air gap 16 is filled with the resin 17.

Figure 7B:
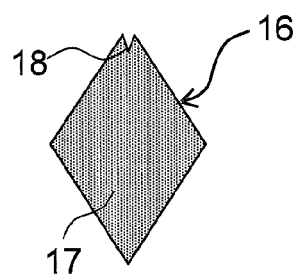
FIG. 7B is a perspective view showing the shape of the air gap in a variation in which the air gap is formed in the shape of a polygon other than a pentagon.

In the example shown in FIG. 7B, the above-described horizontal cross section of the air gap 16 is formed in the shape of a quadrangle. In the air gap 16, the wedge portion 18 protruding inwardly is provided in the corner portion on the outer side of the quadrangle in the above-described radial direction.

Figure 7C:
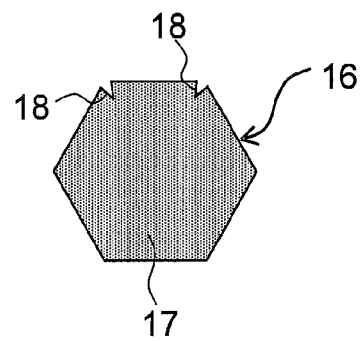
FIG. 7C is a perspective view showing the shape of the air gap in a variation in which the air gap is formed in the shape of a polygon other than a pentagon.

In the example shown in FIG. 7C, the above-described horizontal cross section of the air gap 16 is formed in the shape of a hexagon. In the air gap 16, the wedge portion 18 protruding inwardly is provided in each of two corner portions on the outer side of the hexagon in the above-described radial direction.

In the variations of FIGS. 7A to 7C, as in the embodiment described above, it is also possible to enhance the rigidity of the iron core 10.

(5) A case where a semi-open type rotor is used

In the above-described embodiment, the rotor 3 is a so-called closed type in which the cylindrical outer circumferential portion of the iron core 10 is closed. The present disclosure is not limited to this configuration; a semi-open type configuration in which the cylindrical outer circumferential portion of the iron core is open at places of the permanent magnets 11 may be applied. An example of such a variation is shown in FIG. 8.

Figure 8:
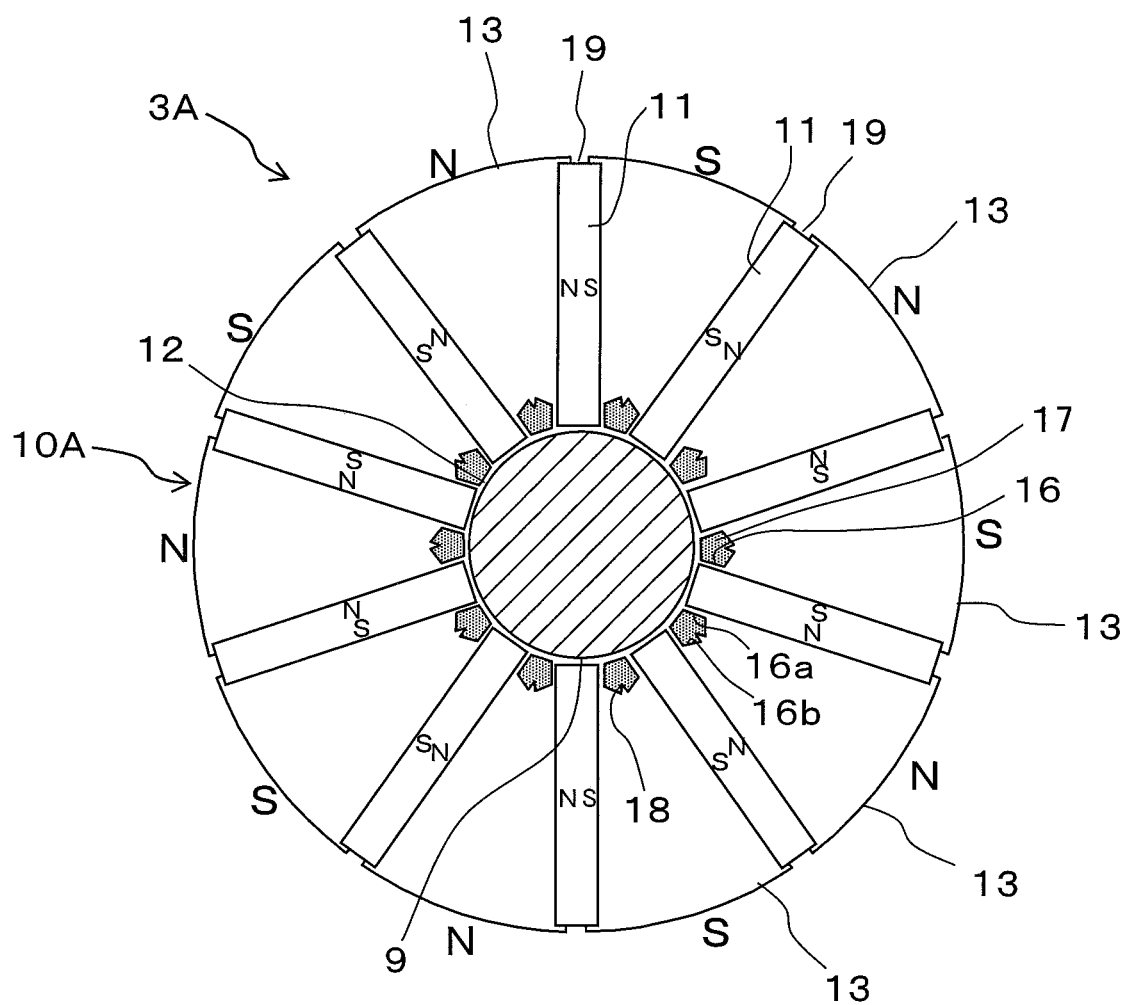
FIG. 8 is an end surface view of a semi-open type rotor of a variation.

As shown in FIG. 8, a rotor 3A of the present variation has opening portions 19 in portions on the outer side of the permanent magnets 11 of an iron core 10A in the above-described radial direction. With the arrangement, the rotor 3A is configured to be a semi-open type in which the cylindrical outer circumferential portion of the iron core 10 is not closed.

When the stator 2 is energized, a magnetic field opposite to the magnetization of the magnet is applied from the stator 2 to the permanent magnet 11 of the rotor 3A, and thus so-called demagnetization occurs in the permanent magnets 11. Here, a portion to which the maximum magnetic flux is applied from the stator 2 at the time of the above-described energization is the outermost portion of the permanent magnet 11 of the iron core 10A in the above-described radial direction. Hence, in the present variation, the opening portion 19 is provided in the outermost portion of the permanent magnet 11 of the iron core 10A in the above-described radial direction, and thus the arrangement in which the demagnetization of the permanent magnet 11 occurs most significantly is avoided, with the result that the maximum magnetic flux is prevented from being applied from the stator 2 to the permanent magnet 11 at the time of the above-described energization and that it is possible to reduce the decrease in the rotational characteristic of the rotor 3.

The other configurations of the rotor 3A in the present variation are the same as in the rotor 3 in the above-described embodiment.

In the present variation, as in the embodiment described above, it is possible to enhance the rigidity of the iron core 10A.

(6) Others

Although in the above-described embodiment and each of the variations, the example where the horizontal cross section of the air gap 16 is polygonal has been described, the present disclosure is not limited to this configuration. That is, the horizontal cross section of the air gap 16 can be formed in an arbitrary shape such as a circle or a sector. Although the rotating electrical machine has been described using the motor as an example, the present disclosure may be applied to a generator.

In addition to what has been described above, the methods of the above-described embodiment and each of the variations may be appropriately combined and utilized. In addition, although not illustrated, in the above-described embodiment and each of the variations, many modifications are possible without departing from the spirit thereof.

What is claimed is:

1. A rotating electrical machine comprising:
    a stator; and
    a rotor,
    the rotor including:
        a cylindrical iron core that is fixed to a shaft and comprises a radial direction and an axial direction;
        a plurality of permanent magnets that is embedded in the iron core;
        a plurality of air gaps that is provided in a portion on an inner side of the iron core in the radial direction;
        a wedge portion that is provided along the axial direction so as to protrude within the air gap; and
        a non-magnetic reinforcing member that is filled in the air gap;
    a cross sectional shape of the air gap in a cross section perpendicular to the axial direction being a polygon,
    the air gap including:
        magnet facing surfaces positioned on both sides in a circumferential direction, configured to be two sides of the polygon so as to respectively face a side surface which is a magnetic flux generating surface of the permanent magnet and to reduce a leakage magnetic flux to the inner side of the rotor in the radial direction; and
        magnetic flux guide surfaces respectively positioned on outer sides than the magnet facing surfaces in the radial direction, configured to be at least one side of the polygon so as to guide a magnetic flux of the permanent magnet to the outer side of the rotor in the radial direction; and
    the wedge portion being provided on a position of a corner portion of the polygon, the corner portion being located on an end portion of the magnetic flux guide surfaces.

2. The rotating electrical machine according to claim 1, wherein:
    the wedge portion is formed such that at least one of a length along a direction of protrusion and a length along a circumferential direction is changed in the axial direction.

3. A rotating electrical machine comprising:
    a stator; and
    a rotor,
    the rotor including:
        a cylindrical iron core that is fixed to a shaft and comprises a radial direction and an axial direction;
        a plurality of permanent magnets that is embedded in the iron core;
        a plurality of air gaps that is provided in a portion on an inner side of the iron core in the radial direction;
        means for blocking a magnetic flux of the permanent magnet, filled in the air gap; and
        means for enhancing a rigidity of the iron core, provided in the air gap, and
    a cross sectional shape of the air gap in a cross section perpendicular to the axial direction being a polygon,
    the air gap including:
        magnet facing surfaces positioned on both sides in a circumferential direction, configured to be two sides of the polygon so as to respectively face a side surface which is a magnetic flux generating surface of the permanent magnet and to reduce a leakage magnetic flux to the inner side of the rotor in the radial direction; and
        magnetic flux guide surfaces respectively positioned on outer sides than the magnet facing surfaces in the radial direction, configured to be at least one side of the polygon so as to guide a magnetic flux of the permanent magnet to the outer side of the rotor in the radial direction; and
    the means for enhancing a rigidity of the iron core being provided on a position of a corner portion of the polygon, the corner portion being located on an end portion of the magnetic flux guide surfaces.

4. The rotating electrical machine according to claim 1, wherein:
    the reinforcing member comprises a resin.

* * * * *